US008559948B2

(12) United States Patent
Chin et al.

(10) Patent No.: US 8,559,948 B2
(45) Date of Patent: Oct. 15, 2013

(54) METHODS AND SYSTEMS FOR MULTI-MODE TERMINAL SCANNING

(75) Inventors: Tom Chin, San Diego, CA (US); Ayman Fawzy Naguib, Cupertino, CA (US); Guangming Carl Shi, San Diego, CA (US); Matthias Brehler, Boulder, CO (US); Serguei A. Glazko, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 910 days.

(21) Appl. No.: 12/211,952

(22) Filed: Sep. 17, 2008

(65) Prior Publication Data

US 2009/0279517 A1   Nov. 12, 2009

Related U.S. Application Data

(60) Provisional application No. 61/052,264, filed on May 11, 2008.

(51) Int. Cl.
*H04W 4/00* (2009.01)
(52) U.S. Cl.
USPC ........ 455/435.1; 370/335; 370/342; 455/434; 455/435.2; 455/437
(58) Field of Classification Search
USPC ......... 370/310, 328, 329, 330, 331, 335, 342; 455/403, 422.1, 434, 435.1, 435.2, 455/436, 437, 442, 444
See application file for complete search history.

(56) References Cited

U.S. PATENT DOCUMENTS

| 7,460,867 | B2 * | 12/2008 | Kim et al. | 455/434 |
|---|---|---|---|---|
| 7,567,820 | B2 * | 7/2009 | Bitran et al. | 455/552.1 |
| 2007/0097922 | A1 * | 5/2007 | Parekh et al. | 370/332 |
| 2007/0178898 | A1 * | 8/2007 | Kim et al. | 455/434 |
| 2007/0249387 | A1 * | 10/2007 | Doradla et al. | 455/552.1 |
| 2007/0275746 | A1 * | 11/2007 | Bitran | 455/509 |
| 2009/0156215 | A1 * | 6/2009 | Pitkamaki | 455/437 |
| 2010/0246433 | A1 * | 9/2010 | Kim et al. | 370/252 |

FOREIGN PATENT DOCUMENTS

| CN | 1965603 A | 5/2007 |
|---|---|---|
| CN | 101064916 A | 10/2007 |
| JP | 2009514453 | 4/2009 |
| WO | 2005120179 A2 | 12/2005 |
| WO | 2007050920 | 5/2007 |
| WO | WO2007051184 | 5/2007 |

OTHER PUBLICATIONS

International Search Report and Written Opinion—PCT/US2009/042839, International Search Authority—European Patent Office—Oct. 13, 2009.
3GPP TSG-RAN WG1 #53bis R1-082555, Jun. 30-Jul. 4, 2008.
Taiwan Search Report—TW098115367—TIPO—Feb. 25, 2013.

* cited by examiner

*Primary Examiner* — Chi Pham
*Assistant Examiner* — Weibin Huang
(74) *Attorney, Agent, or Firm* — Tyler J. Overall

(57) ABSTRACT

Certain embodiments of the present disclosure provide a method for scanning for paging messages in a second radio access technology (RAT) network, such as a CDMA network, while connected to a first RAT network, such as a WiMAX network. For certain embodiments, an enhanced scanning request message may facilitate establishing a scanning cycle in the first RAT that aligns with a paging cycle of the second RAT.

36 Claims, 12 Drawing Sheets

| Name | Size | Definition |
|---|---|---|
| Interleaving interval | 16 bits | Interleaving interval in number of frames |
| Recommended start frame | 16 bits | Start frame number in least significant 16 bits |
| Scanning request conditions | 8 bits | Bit #0:<br>0: Optional (BS may deny request or change parameters in MOB_SCN-REQ)<br>1: Mandatory (BS must grant all parameters in MOB_SCN-REQ)<br>Bit #1:<br>0: Scanning completes after Scan Iteration<br>1: Scanning completes after MS explicitly deactivates scanning by sending MOB_SCN-REQ, and Scanning Iteration is ignored<br>Bit #2:<br>0: MS includes WiMAX neighbors or scan all neighbors in MOB_NBR-ADV<br>1: MS does not include any neighbor in MOB_SCN-REQ<br>Bit #3:<br>0: Report mode is decided by MOB_SCN-RSP<br>1: No report<br>Bit #4-7: Reserved. Shall be set to 0b0000 |

FIG. 9

METHODS AND SYSTEMS FOR MULTI-MODE TERMINAL SCANNING

PRIORITY APPLICATION

This application claims benefit of priority from U.S. Provisional Patent Application Ser. No. 61/052,264, filed May 11, 2008 and entitled "Systems and Methods for Multimode Wireless Communication," which is fully incorporated herein by reference for all purposes.

TECHNICAL FIELD

Certain embodiments of the present disclosure generally relate to wireless communication and, more particularly, to communicating with mobile devices that support multiple radio access technologies.

BACKGROUND

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS). In order to expand the services available to subscribers, some MSs support communications with multiple radio access technologies (RATs). For example, a multi-mode MS may support WiMAX for broadband data services and code division multiple access (CDMA) for voice services.

Unfortunately, in conventional systems, inefficient switching between the two networks may cause a reduction in throughput on either service.

SUMMARY

Certain embodiments of the present disclosure provide a method for scanning for paging messages in a second radio access technology (RAT) network, such as a CDMA network, while connected to a first RAT network, such as a WiMAX network. For certain embodiments, an enhanced scanning request message may facilitate establishing a scanning cycle in the first RAT that aligns with a paging cycle of the second RAT.

Certain embodiments of the present disclosure generally provide a method for communicating by a multi-mode mobile station (MS) with first and second networks via first and second radio access technologies (RATs). The method generally includes calculating a start frame number and an interleaving interval for a scanning cycle for the mobile station to perform with the first RAT, such that the scanning interval of the scanning cycle aligns with a paging window of a paging cycle of the second RAT, sending a scanning request to a base station of the first network to establish the scanning cycle with the start frame number and scanning interval, wherein at least one of the start frame number and interleaving interval sent in the request is greater than 8 bits, and switching to the second network to monitor for paging messages during the scanning interval of the scanning cycle without terminating the connection with the first network.

Certain embodiments of the present disclosure generally provide an apparatus for communicating by a multi-mode mobile station (MS) with first and second networks via first and second radio access technologies (RATs). The apparatus generally includes logic for calculating a start frame number and an interleaving interval for a scanning cycle for the mobile station to perform with the first RAT, such that the scanning interval of the scanning cycle aligns with a paging window of a paging cycle of the second RAT, logic for sending a scanning request to a base station of the first network to establish the scanning cycle with the start frame number and scanning interval, wherein at least one of the start frame number and interleaving interval sent in the request is greater than 8 bits, and logic for switching to the second network to monitor for paging messages during the scanning interval of the scanning cycle without terminating the connection with the first network.

Certain embodiments of the present disclosure generally provide an apparatus for communicating by a multi-mode mobile station (MS) with first and second networks via first and second radio access technologies (RATs). The apparatus generally includes means for calculating a start frame number and an interleaving interval for a scanning cycle for the mobile station to perform with the first RAT, such that the scanning interval of the scanning cycle aligns with a paging window of a paging cycle of the second RAT, means for sending a scanning request to a base station of the first network to establish the scanning cycle with the start frame number and scanning interval, wherein at least one of the start frame number and interleaving interval sent in the request is greater than 8 bits, and means for switching to the second network to monitor for paging messages during the scanning interval of the scanning cycle without terminating the connection with the first network.

Certain embodiments of the present disclosure provide a computer-program product for communicating by a multi-mode mobile station (MS) with first and second networks via first and second radio access technologies (RATs) comprising a computer readable medium having instructions stored thereon, the instructions being executable by one or more processors. The instructions generally include instructions for instructions for calculating a start frame number and an interleaving interval for a scanning cycle for the mobile station to perform with the first RAT, such that the scanning interval of the scanning cycle aligns with a paging window of a paging cycle of the second RAT, instructions for sending a scanning request to a base station of the first network to establish the scanning cycle with the start frame number and scanning interval, wherein at least one of the start frame number and interleaving interval sent in the request is greater than 8 bits, and instructions for switching to the second network to monitor for paging messages during the scanning interval of the scanning cycle without terminating the connection with the first network.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 9 illustrates examples of modified mobile scan request fields, in accordance with embodiments of the present disclosure

DETAILED DESCRIPTION

Figure 1:
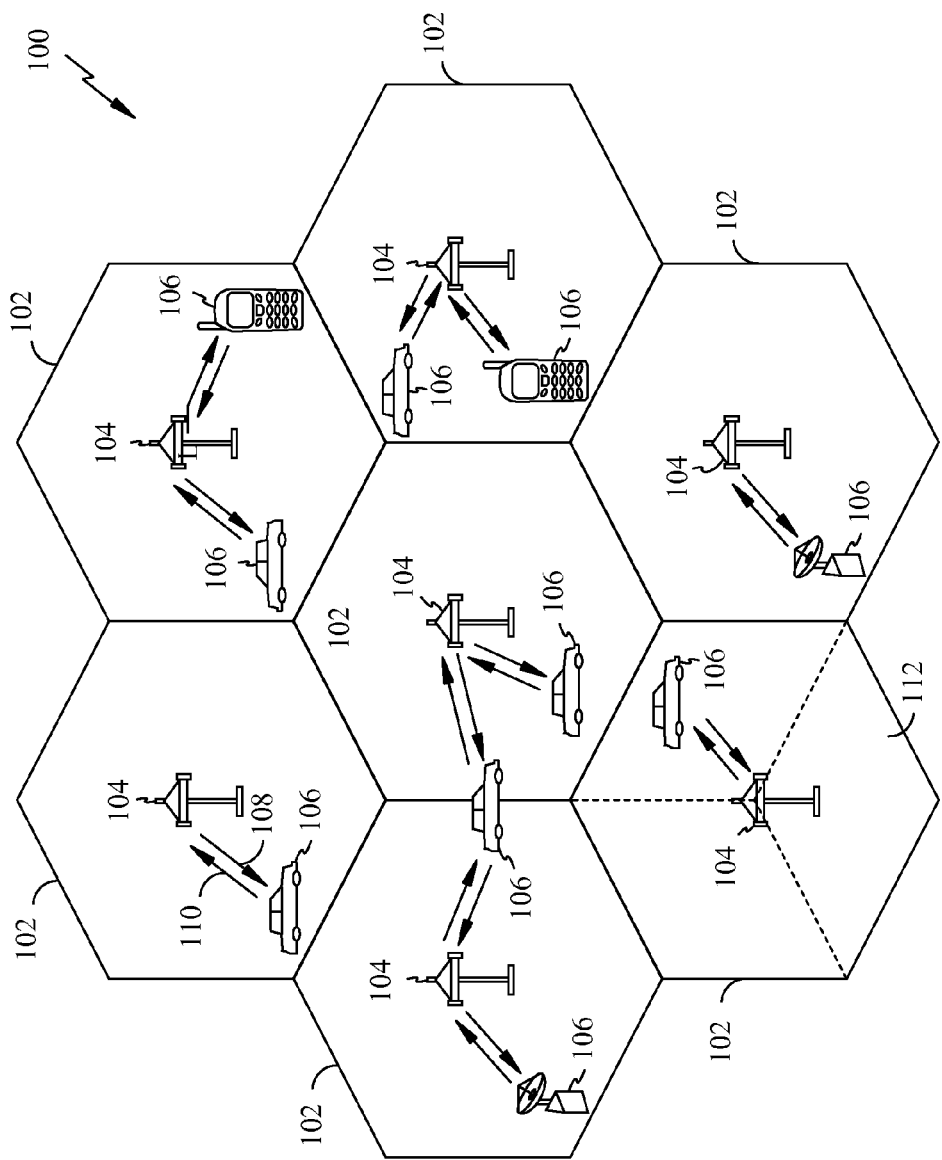
FIG. 1 illustrates an example wireless communication system, in accordance with certain embodiments of the present disclosure.

Embodiments of the present disclosure may allow a multi-mode mobile device supporting both WiMAX and CDMA 1× radio access technologies (RATs) to switch between a WiMAX network and a CDMA network to monitor a CDMA paging channel during a WiMAX scanning interval. Specifically, embodiments may provide a method and apparatus allowing a multi-mode MS to determine a set of modified WiMAX mobile scan request (MOB_SCN-REQ) parameters and to send a modified MOB_SCN-REQ notifying a serving WiMAX BS of the mandatory nature of the request parameters in an attempt to ensure that a WiMAX scanning interval aligns with a CDMA page request listening window.

Exemplary Wireless Communication System

The methods and apparatus of the present disclosure may be utilized in a broadband wireless communication system.

As used herein, the term "broadband wireless" generally refers to technology that may provide any combination of wireless services, such as voice, Internet and/or data network access over a given area. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes. IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
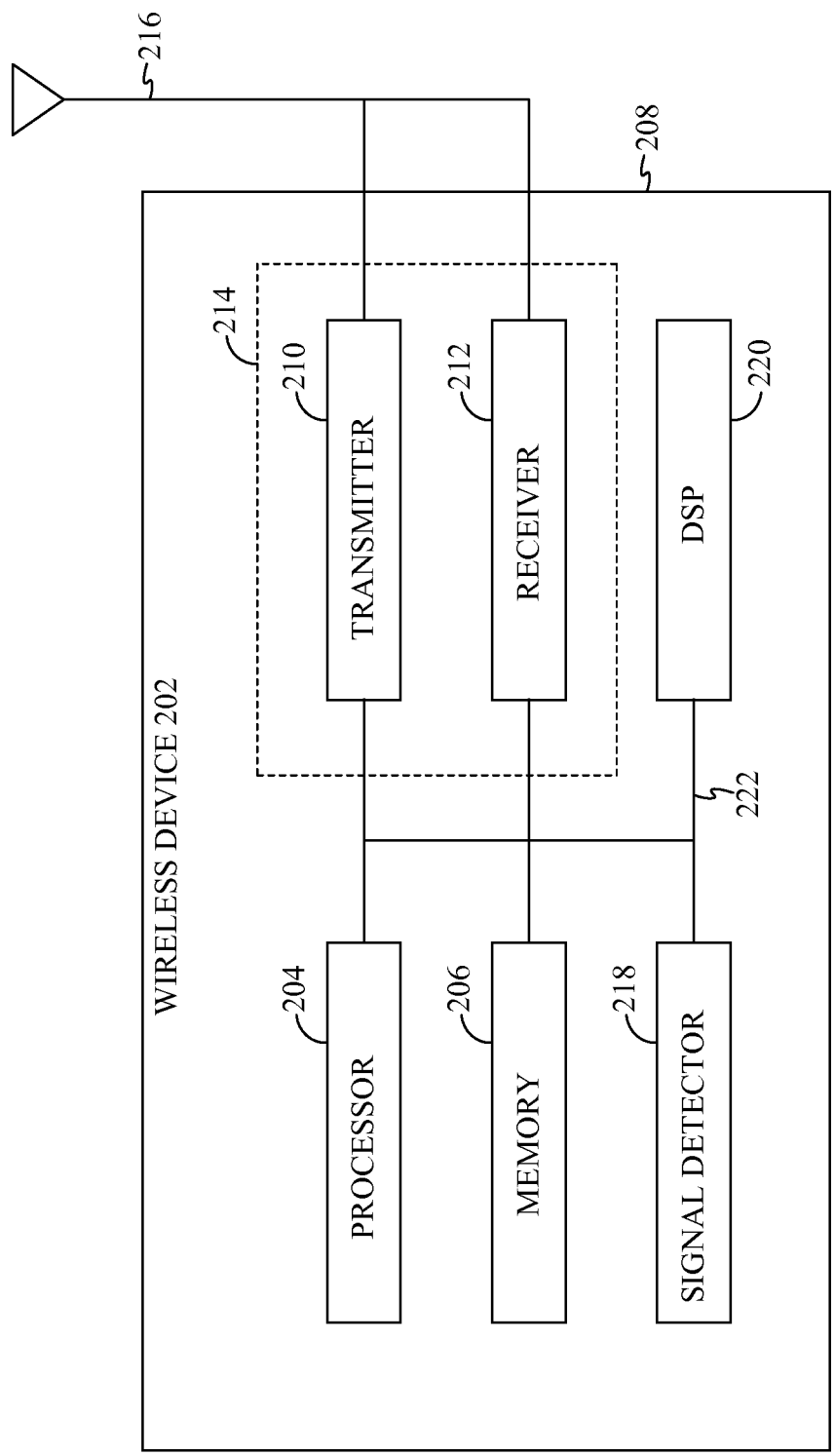
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
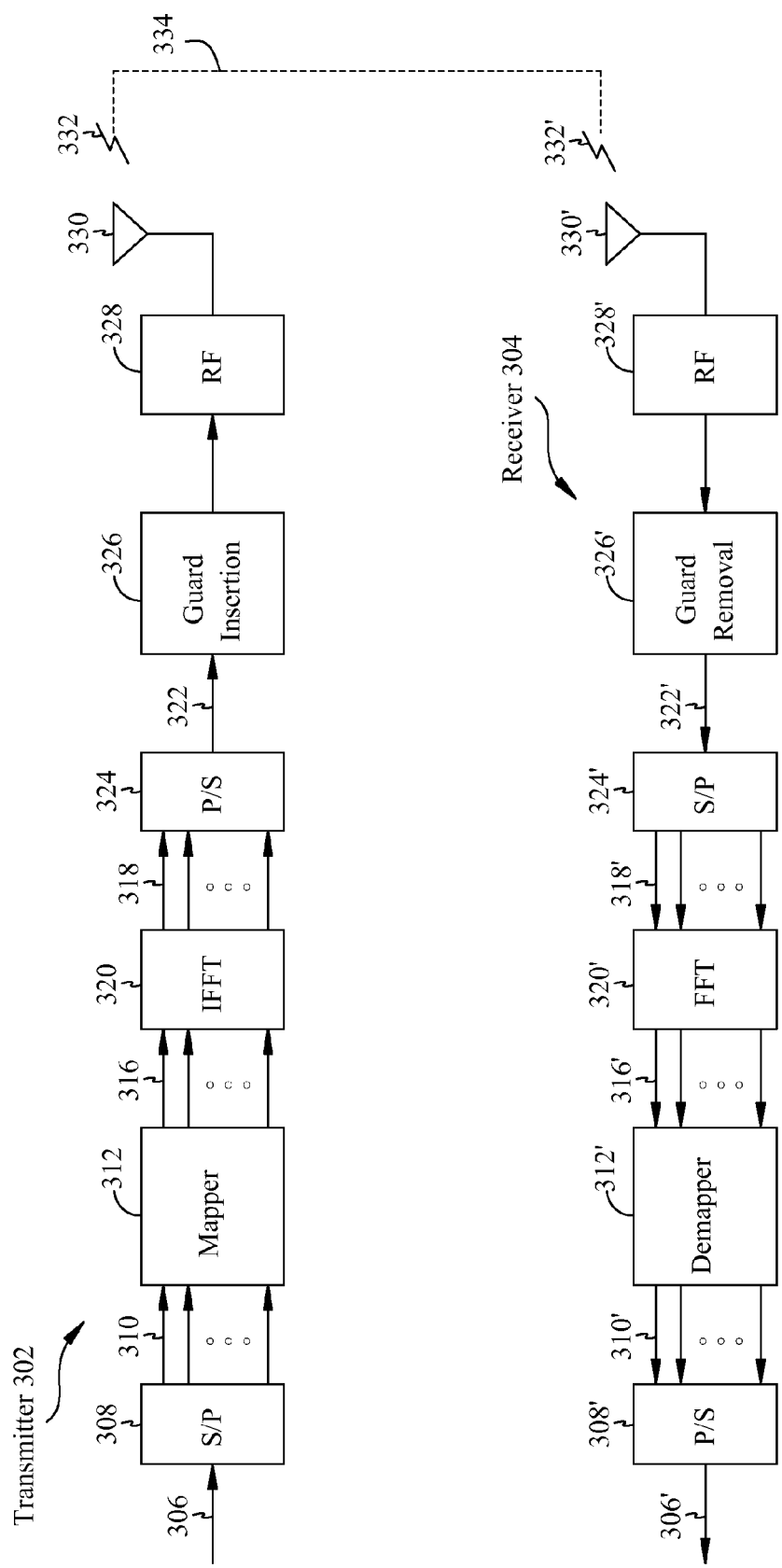
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor.

Figure 4:
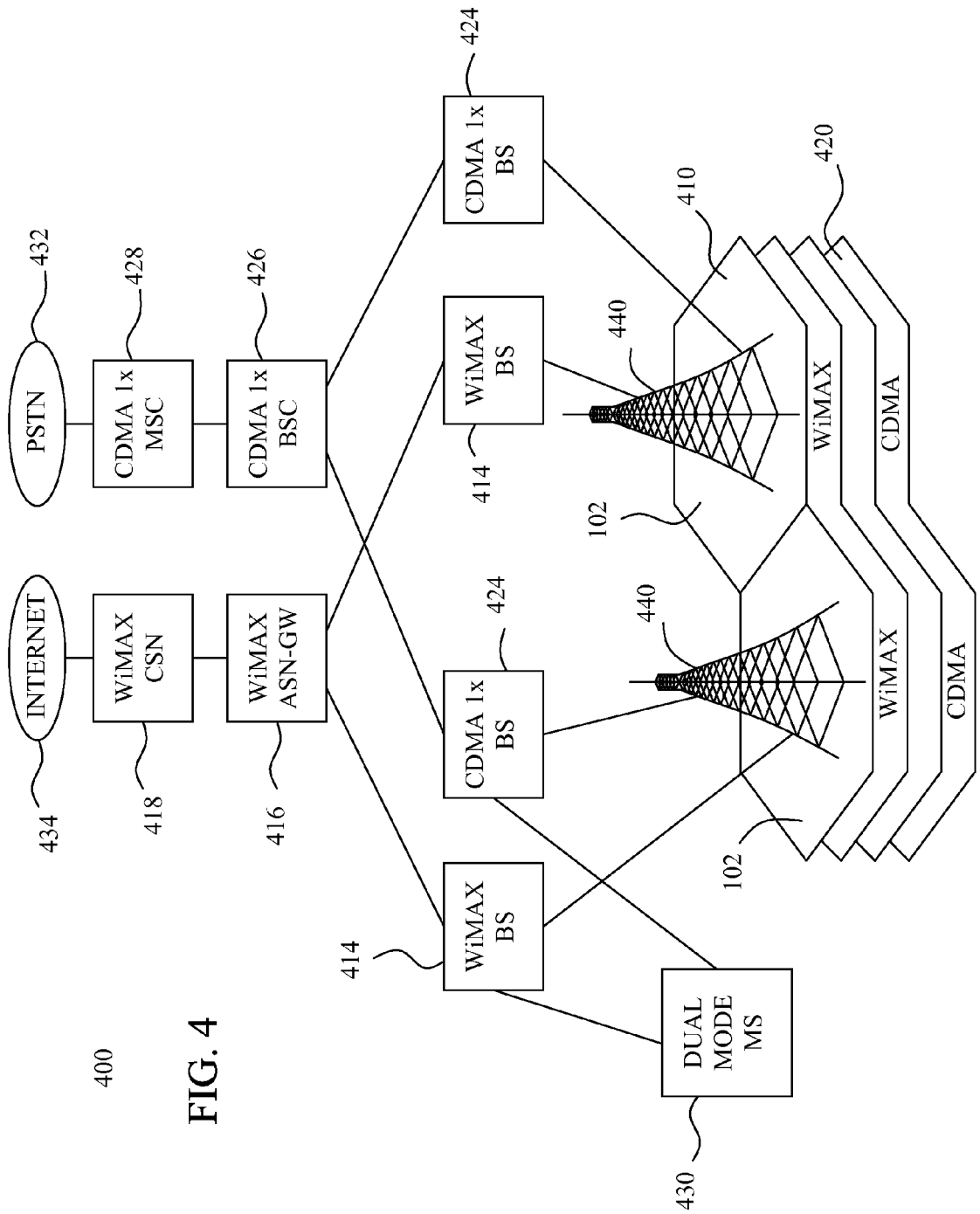
FIG. 4 illustrates a WiMAX network overlaid on a code division multiple access (CDMA) 1× network, in accordance with embodiments of the present disclosure.

Exemplary Multi-Mode Terminal Operation in CDMA 1× Circuit-Switched and WiMAX Overlaid Networks In the deployment of wireless services, different radio access technologies (RATs) may be combined to provide multiple services. For example, FIG. 4 illustrates a system 400 in which a mobile WiMAX network 410 may be combined with (or "overlaid" on) a code division multiple access (CDMA) 1× network 420 to provide both broadband data and voice service. In the system, subscribers may utilize a single dual-mode (CDMA and WiMAX) mobile station (MS) 430 to tune to the CDMA network to utilize a public switched telephone network (PSTN) 432 and tune to the WiMAX network to utilize a broadband data service in accessing the internet 434.

In conventional systems, inefficient switching between the two networks may cause a reduction in throughput on either service. For example, in conventional systems, a dual-mode MS 430 connected to a WiMAX network for broadband services may periodically halt the exchange of data traffic and scan neighboring WiMAX BSs to evaluate available signal quality and, when necessary, effectuate a hand off (HO), in accordance with the IEEE 802.16 standard. Moreover, the dual-mode MS 430 may have to periodically switch to the CDMA network to check for a CDMA page message and perform CDMA registration with a CDMA 1×BS 424. The frequent switching from broadband data service to WiMAX BS scanning and CDMA page monitoring may disrupt the existing broadband data service and detract from the user experience.

As illustrated in FIG. 4, the CDMA network 420 may be overlaid with the WiMAX network 410. CDMA service may be provided to a geographic area by a plurality of hardware and software components. This geographic area may be divided into regions, referred to as cells 102, centered around a service tower 440. In an attempt to increase spatial efficiency, a single service tower 440 may support multiple RATs. For example, a service tower 440 may support both a WiMAX base station (BS) 414 as well as a CDMA BS 424.

A CDMA BS 424 may contain equipment for encrypting and decrypting communications with a Base Station Controller (BSC) 426, which may provide intelligent control for multiple CDMA BSs. A BSC 426 may have tens or even hundreds of BSs under its control. The BSC 426 may handle the allocation of radio channels, receive measurements from the dual-mode MSs 430 or control handovers from one BS to another BS. Further, the BSC 426 may act as a concentrator where a plurality of low capacity connections to BSs becomes reduced to a smaller number of connections towards the Mobile Switching Center (MSC) 428.

The MSC 428 may serve as a primary service delivery node for the CDMA network. It may be responsible for handling voice calls and text messages (SMSs), specifically, setting up and releasing end-to-end connections, handling mobility and hand-over requirements during the call, and taking care of charging and real time pre-paid account monitoring. Additionally, a MSC 428 may determine the location of a MS that is being called, and may interface with a landline, such as a Public Switched Telephone Network (PSTN).

Similar to the BSC 426, the access service network gateway (ASN-GW) 416 may control multiple BSs in the WiMAX network 410. The ASN-GW 416 may allocate channels, receive measurements from the dual-mode MSs 430 and control handovers from one BS to another BS. The ASN-GW 416 may allow a dual-mode MS 430 to access the internet 434 via an internet service provider's connectivity service network (CSN) 418. The CSN 418 may provide, among other things, Authentication, Accounting, Authorization (AAA), domain name system (DNS), dynamic host configuration protocol (DHCP), and firewall services for the internet service provider.

Figure 5:
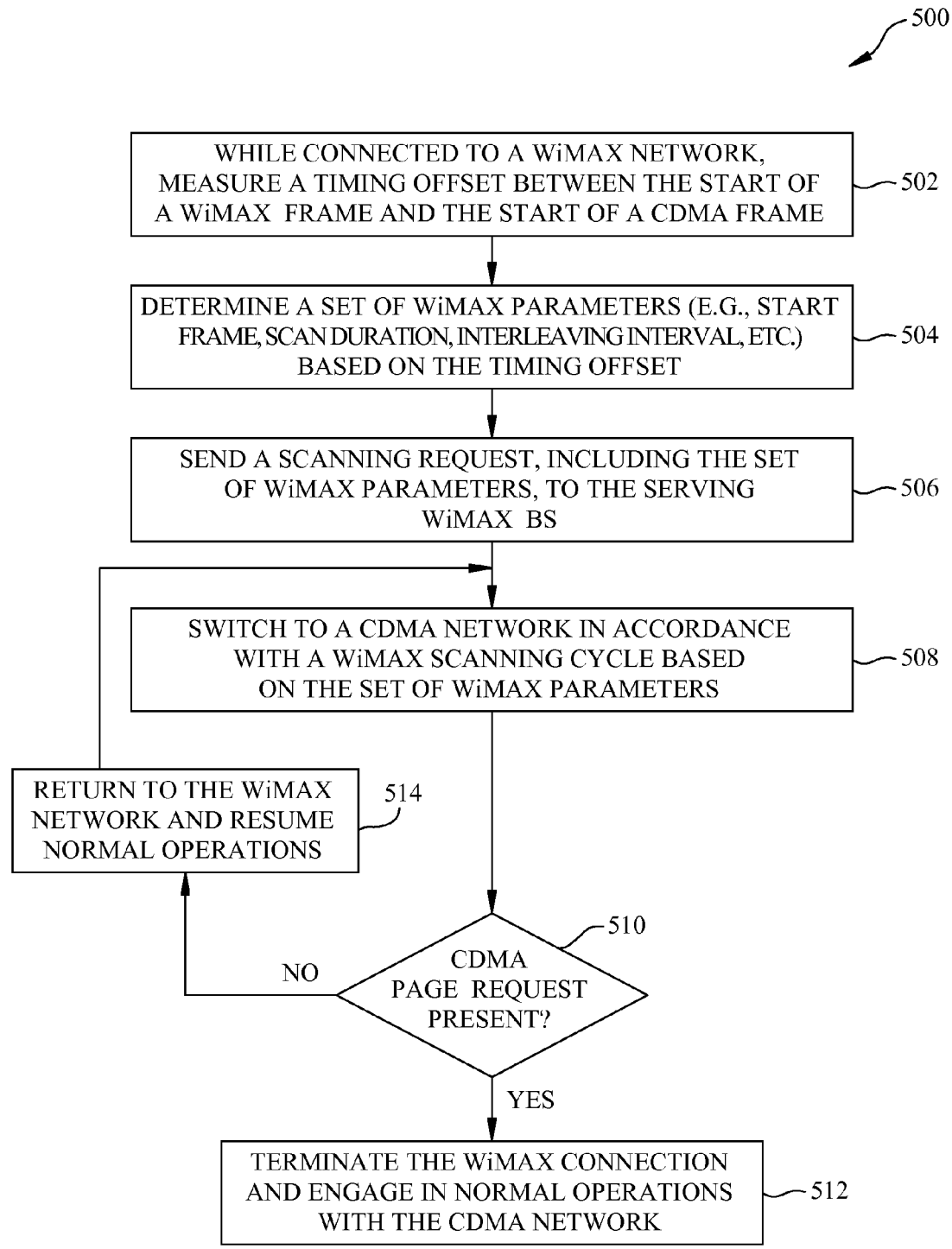
FIG. 5 illustrates example operations performed by a mobile station in switching from a WiMAX network to a CDMA 1× network to listen for paging requests during WiMAX scanning intervals, in accordance with embodiments of the present disclosure.

FIG. 5 illustrates example operations 500 that may be performed, for example, by a dual-mode MS 430, for monitoring a CDMA paging channel during WiMAX scanning intervals, in accordance with certain embodiments of the present disclosure. The operations 500 may be performed, for example, by an MS in an effort to allow the MS to receiver a voice call routed through the CDMA 1× network while connected to the WiMAX network.

Figure 6:
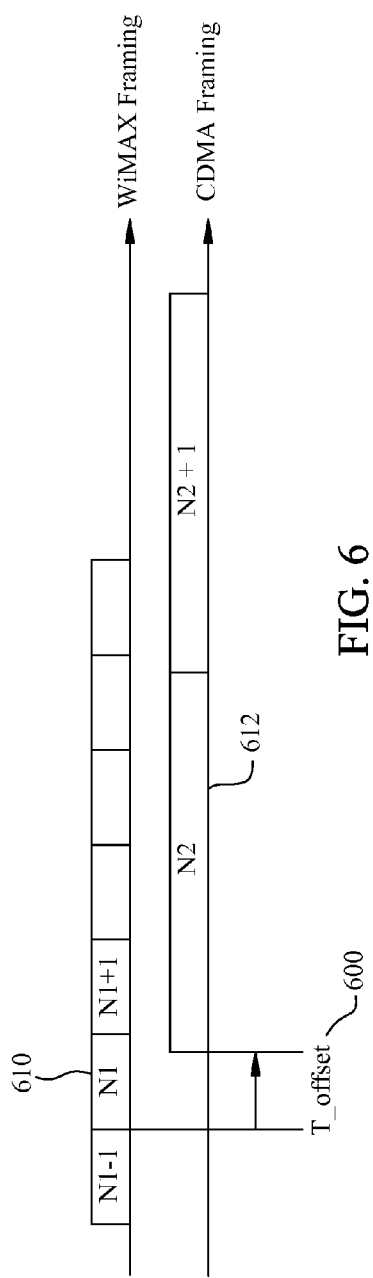
FIG. 6 illustrates an example of a time offset between the start of a frame in a WiMAX communication and the start of a frame in a CDMA 1× communication.

Operations begin, at 502, with the dual-mode MS 430 measuring a timing offset between the start of a WiMAX frame and the start of a CDMA frame. Such an offset is shown in FIG. 6 as T_offset 600 between the start of an arbitrary WiMAX frame with frame number N1 610 and the start of the corresponding CDMA frame with CDMA system time (in frame number) N2 612. To measure the CDMA frame timing, the MS 430 may require a scanning interval in which to switch from the WiMAX network to the CDMA network. While measuring the timing offset, the dual-mode MS 430 may also determine the WiMAX frame number and the CDMA system time in CDMA frames. It should be noted that a WiMAX frame (T_wm_frame) may have a shorter duration than a CDMA frame. For example, a traditional CDMA frame may have a duration of 20 milliseconds while a comparable WiMAX frame may be 5 milliseconds.

At 504, the dual-mode MS 430 may determine a set of WiMAX parameters based on the previously calculated timing offset. The WiMAX parameters determined by the MS 430 may include, but are not limited to, the WiMAX start frame, the duration of a WiMAX scanning interval (scan duration), and the interleaving interval duration.

In some instances (e.g., instances in which the MS is monitoring only a paging channel (PCH)), the scan duration (in units of WiMAX frames) may be determined as described by Equation (1):

$$\text{Scan\_Duration} = \text{Ceiling}\left[\frac{80 \text{ ms} + \text{T\_offset}}{\text{T\_wm\_frame}}\right] + \text{Ceiling}\left[\frac{\max(\text{T\_offset}, \text{T\_tune}) - \text{T\_offset}}{\text{T\_wm\_frame}}\right] \quad (1)$$

where T_tune is the time it takes for the MS to tune from the WiMAX network to the CDMA network and where T_wm_frame may be 5 milli-seconds. The Ceiling function takes the smallest integer that is greater than or equal to its argument (i.e., Ceiling[x] will return the smallest integer>=x). However, in some instances (e.g., instances in which the MS is monitoring a PCH and a quick paging channel (QPCH)) the scan duration (in units of WiMAX frames) may be determined as described by Equation (2).

$$\text{Scan\_Duration} = \text{Ceiling}\left[\frac{180 \text{ ms} + \text{T\_offset}}{\text{T\_wm\_frame}}\right] + \text{Ceiling}\left[\frac{\max(\text{T\_offset}, \text{T\_tune}) - \text{T\_offset}}{\text{T\_wm\_frame}}\right] \quad (2)$$

Since the MS 430 must listen to both the CDMA paging channel and the CDMA quick paging channel, the required listening time may be larger than in previously described embodiments.

It is important to note, however, current versions of the IEEE 802.16 standard limit the maximum duration of a WiMAX interleaving interval. Specifically, a WiMAX interleaving interval may be determined by taking the maximum value of a set of numbers, k, that satisfy the following two conditions:

$$k < 256; \text{ and} \qquad (3)$$

$$\frac{1.28 \text{ sec} * 2^{Slot\_cycle\_Index} / T\_wm\_frame}{(Scan\_Duration + k)} = \text{Positive Integer}$$

The above Slot_Cycle_Index is the parameter used to determine the CDMA 1× paging cycle length under the CDMA standards. For example, where the duration of a WiMAX frame (T_wm_frame) is five milliseconds, the Slot_Cycle_index is 1, and the scan duration is 20 frames, the numerator of condition ii) equals 512. Accordingly, the set of numbers, k, that satisfies both conditions includes {236, 108, 44, 12}, and the maximum value of said set of numbers (i.e., the scanning cycle, N, in units of WiMAX frames) is 236.

Additionally, when determining a set of WiMAX parameters, the start frame may refer to the least significant 8 bits of the absolute WiMAX frame number. Consequently, embodiments of the present disclosure may allow the WiMAX start frame to be determined as described in Equation (4), when the MS is only monitoring the PCH:

$$\text{Start\_Frame} = \left[ \frac{20 \text{ ms}}{T\_wm\_frame} * M + N1 - \tau \right] \bmod 256 \qquad (4)$$

where τ may be expressed as the $$\text{Ceiling} \left[ \frac{\max(T\_offset, T\_tune) - T\_offset}{T\_wm\_frame} \right]$$

and M may be expressed as (4*PGSLOT−N2) mod $64 * 2^{Slot\_Cycle\_Index}$. PGSLOT is the parameter used to determine the offset per CDMA 1× paging cycle under CDMA standards and it depends on the IMSI (International Mobile Station Identifier) of the MS 430. However, embodiments of the present disclosure may allow the WiMAX start frame to be determined as described in Equation (5), when the MS is monitoring both the PCH and the QPCH:

$$\text{Start\_Frame} = \left[ \frac{20 \text{ ms}}{T\_wm\_frame} * M + N1 - \frac{100 \text{ ms}}{T\_wm\_frame} - \tau \right] \bmod 256 \qquad (5)$$

At 506, a mobile scanning request (MOB_SCN-REQ), including the set of WiMAX parameters, may be sent to the serving WiMAX BS 414. As stated before, the set of WiMAX parameters may include a WiMAX starting frame, scan duration, interleaving interval, and a number of scanning cycles the MS is requesting (or the number of scanning iterations to be performed).

The number of iterations may be set to any number between 1 and 255 and indicates the number of scanning cycles requested by the dual-mode MS 430. Before completing all iterations, the MS 430 may send another scanning request to renew periodic switching intervals. In some embodiments, the default iteration value may be 255 to reduce the number of scanning signal requests sent by the MS 430.

The WiMAX BS 414 may uses one or more of the provided parameters in establishing a WiMAX scanning cycle such that a WiMAX scanning duration generally aligns with each of the CDMA paging windows. At 508, the dual-mode MS 430 may switch to the CDMA network in accordance with the scanning cycle established by the WiMAX BS 414.

At 510, the dual-mode MS 430 may determine if there is a CDMA page request destined for the MS 430 present on the paging channel. If the CDMA paging channel does not have a paging request destined for the MS 430, the MS may return to the WiMAX network and resume normal WiMAX operations, at 514. However, if the MS 430 receives a CDMA paging request, the MS 430 may terminate the WiMAX connection and engage in normal operations with the CDMA network, as illustrated at 512.

Figure 7:
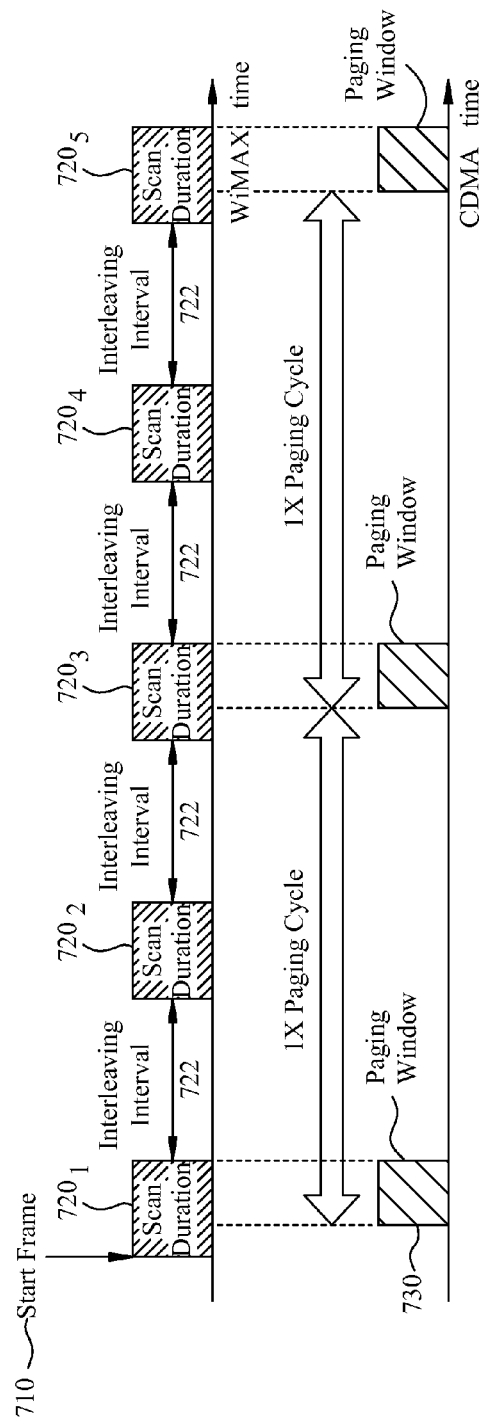
FIG. 7 illustrates the alignment of WiMAX scanning intervals with CDMA 1× paging windows based on parameters determined from a time offset measurement, in accordance with embodiments of the present disclosure.

FIG. 7 illustrates that, in some embodiments, the WiMAX scan durations $720_{1-5}$ may be timed such that the MS 430 has sufficient time to tune from the WiMAX network to the CDMA network and listen to a CDMA paging channel for an entire paging window during a single scan duration 720. However, in certain embodiments, the WiMAX scan duration 720 may be insufficient in length to allow the MS to listen to an entire CDMA paging window. In such embodiments, the MS may tune to the CDMA network just long enough to listen to a CDMA paging channel slot corresponding to the paging channel slot assigned to the MS 430 during a CDMA paging window 730. However, the dual-mode MS 430 may be assigned a paging channel slot. Accordingly, dual-mode MS 430 may switch back to the WiMAX network after listening for the paging channel slot but before the end of the CDMA paging window 730.

Additionally, it should be noted that, due to the limited size of the interleaving interval 722 under WiMAX standards, more than one WiMAX scanning cycles may occur between subsequent CDMA paging windows 730. Accordingly, the dual-mode MS 430 may not tune to the CDMA network during every WiMAX scan duration 720. During scan durations 720 that do not align with CDMA paging windows, the dual-mode MS 430 may scan neighboring WiMAX BSs to evaluate the corresponding signal quality.

Figure 8:
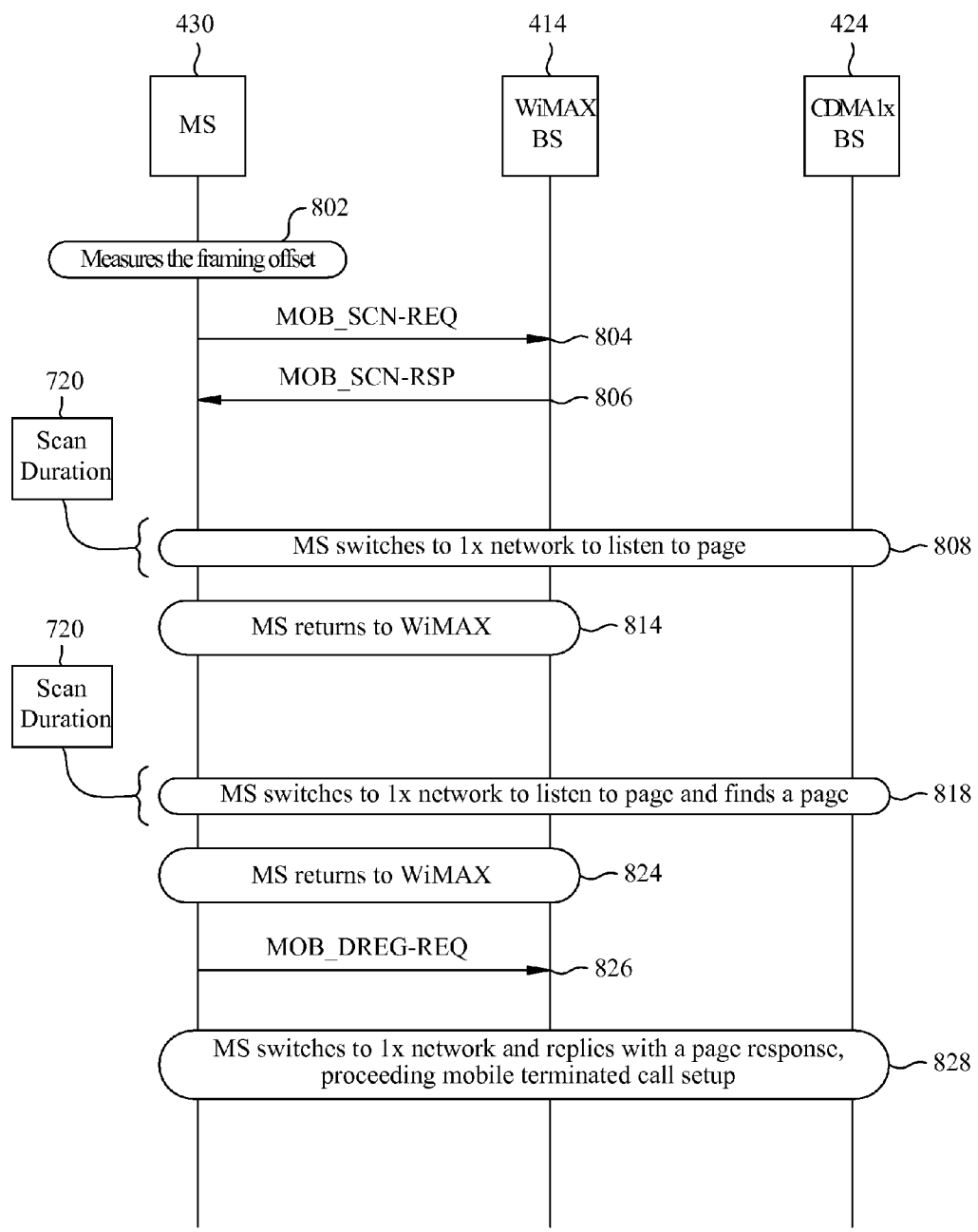
FIG. 8 illustrates example exchanges between a multi-mode mobile station and a WiMAX and CDMA base station, in accordance with embodiments of the present disclosure.

FIG. 8 illustrates example exchanges between a dual-mode MS 430, a WiMAX BS 414, and a CDMA BS 424, in accordance with embodiments of the present disclosure. In the present example, the MS 430 may have an initial active connection with a WiMAX BS 414, but also be within a CDMA cell.

In preparation for listening to the CDMA paging channel, the MS 430 may measure the time offset between a WiMAX frame and a CDMA frame, as illustrated at 802. During this measurement period, the MS 430 may also determine a set of WiMAX parameters such as an WiMAX start frame, a scan duration value (measured in units of WiMAX frames), an interleaving interval value (measured in units of WiMAX frames), and a number of iterations, as described above.

After measuring and determining the WiMAX parameters, the MS 430 may then send a mobile scan request (MOB_SCN-REQ) message 804 to the WiMAX BS 414 including said parameters. In response to receiving the MOB_SCN-REQ 804, the WiMAX BS 414 may generate a mobile scan response (MOB_SCN-RSP) 806. Assuming the BS 414 grants the request, the WiMAX BS 414 may send a MOB_SCN-RSP 806 which establishes a start frame 710 and scan duration 720 that aligns a WiMAX scanning duration 720 with each of the CDMA paging windows 730.

Assuming the BS 414 has sent a response 806 granting the request 804, the MS 430 may switch form the WiMAX network to the CDMA network, as illustrated at 808, in accordance with the information in the MOB_SCN-RSP 806. Since the BS 414 acknowledged the MOB_SCN-REQ and granted a scan duration 720, the BS 414 may not send data traffic to the MS 430 during the scan duration 720, ensuring that the MS 430 does not miss any data traffic.

The MS 430 may continue to listen to the CDMA network until it hears a page request destined for the MS 430 or until the CDMA paging window has passed. If the MS 430 does not detect a CDMA page request, the MS 430 may return to the WiMAX network and continue normal WiMAX operations, as illustrated at 814.

The MS may cycle between scan durations 720 and normal WiMAX operations performed during interleaving intervals 722 for the number of iterations indicated in the MOB_SCN-REQ or until the MS 430 receives a CDMA page request destined for said MS, as illustrated at 818. Upon receiving a page request destined for the MS 430, the MS may return to the WiMAX network, as illustrated at 824, and send a MOB_DREG-REQ 826 to the WiMAX BS 414.

After deregistering from the WiMAX network, the MS 430 may reply to the CDMA BS 424 with a CDMA page response and proceed with normal operations with the CDMA network (e.g., setting up a mobile terminated call), as illustrated at 828.

Exemplary Modified MOB_SCN-REQ Message

As described above, utilization of a WiMAX scanning interval to monitor a CDMA paging channel by a multi-mode MS 430, as described above, may improve service continuity in both the CDMA and WiMAX networks. However, limitations in the length of a conventional WiMAX scanning interval may require inefficient powering up during "dummy" scanning intervals that do not correspond to CDMA paging cycles. For certain embodiments of the present disclosure, however, a modified version of a mobile scanning request (MOB_SCN-REQ) message may allow a mobile station to request a longer scanning interval, which may help eliminate wasted scanning intervals.

Under the current version of the IEEE 802.16 standard, the MS may determine and suggest specific values for various scanning parameters, including a scanning interval, interleaving interval, scan iteration, and recommended start frame. As described above, the MS may calculate and select these parameter values in an effort to ensure the WiMAX scanning interval aligns with the CDMA paging window. However, the BS 414 may deny the request or provide alternative parameter values.

Additionally, under the current version of the IEEE 802.16 standard a WiMAX BS may anticipate a response from a MS reporting the results of a scan of neighboring WiMAX BSs (which would not be available if the MS had listened to the CDMA network 420). Moreover, the 8-bit value of the interleaving interval field in a standard MOB_SCN-REQ message may result in an interleaving interval duration insufficient to cover an inter-RAT page interval. The 8-bit value of the scan iteration field may also require the MS to re-request scanning time too frequently.

However, embodiments of the present disclosure may provide a modified version of a mobile scan request message that allows a multi-mode MS supporting both WiMAX and CDMA 1× RATs more control in requesting a scanning interval in order to scan a CDMA network for paging messages. For example, the modified message may allow the MS to determine a set of modified WiMAX parameters to request a scanning interval with a length that matches a paging cycle of the CDMA network and also to notify a serving WiMAX BS of the mandatory nature of the requested parameters in an attempt overcome the previously described deficiencies.

FIG. 9 illustrates an example format of a modified mobile scan request message with an example set of mobile scan request fields, in accordance with certain embodiments of the present disclosure.

In the illustrated example, the interleaving interval field 910 has a length of 16 bits, rather than the 8-bit value under the current version of the IEEE 802.16 standard. The current 8-bit value provides a range of values between 0 and 255. Accordingly, a MOB_SCN-REQ with a standard, 8-bit interleaving interval field 910 may be limited to requesting a 255 frame, or 1.275 second, interleaving interval.

However, 1.275 seconds may be an insufficient duration to cover an inter-RAT page interval (i.e., a CDMA paging cycle), as illustrated in FIG. 7. A larger interleaving interval field, such as the illustrated 16-bit field, may allow a sufficient duration to cover an inter-RAT page interval, thereby possibly avoiding wasted "dummy" listening intervals.

Thus, the use of the larger interleaving interval field 910 may result in increased throughput on the WiMAX network 410. For example, if the CDMA network 420 has a paging cycle longer than the longest possible WiMAX scanning cycle, then the MS 430 may have to schedule two or more sub-optimal WiMAX scanning cycles to maintain alignment between the WiMAX scanning interval and the CDMA listening window. Scheduling two or more sub-optimal WiMAX scanning cycles may result in the MS 430 unnecessarily switching to the CDMA network 420. The time in which the MS 430 is unnecessarily tuned to the CDMA network 420 is time lost to WiMAX throughput. However, by modifying the interleaving interval field 910, embodiments of the present disclosure may offer the MS 430 the flexibility to maintain alignment between WiMAX scanning intervals and the paging cycles of other RATs while increasing WiMAX throughput.

As illustrated, for certain embodiments of the present disclosure, the bit length of a Recommended Start Frame field 920 may also be increased, relative to the conventional 8-bit field under the current version of the IEEE 802.16 standard. The conventional 8-bit field is limited to suggesting one of the subsequent 255 frames, which may prove limiting when trying to align scan intervals with CDMA paging cycles.

By increasing the allowable value of the start frame field 920, as with modifying the interleaving interval field 910, the MS 430 may gain flexibility in maintaining alignment between WiMAX scanning intervals and the CDMA listening windows. The start frame field value may still be calculated in a manner similar to that described above with reference to EQs (4) and (5), but without the MOD 256 operation. Assuming a 24-bit absolute frame number is used, the MOD function in EQs (4) and (5) may be modified to generate a 16-bit Recommended Start Frame value. As an alternative, for certain embodiments, a mobile scan request message may be modified to include a 24-bit Recommended Start Frame field may be used, so that no MOD function is required.

For certain embodiments, a separate scanning request conditions field 930 may also be utilized. This scanning request conditions field may help the MS to communicate additional information to the WiMAX BS.

As an example, the scanning request conditions field 930 may have one or more bits 932 indicating whether one or more of the WiMAX parameters included in the MOB_SCN- REQ message are optional or mandatory. Under current versions of the IEEE 802.16 standard, the MS 430 may include WiMAX parameters such as scanning interval duration, interleaving interval duration, start frame, and scan iteration in a MOB_SCN-REQ sent to the BS 414, but the BS 414 may deny the scan request or implement alternative parameter, ignoring the parameter values sent by the MS 430.

However, as noted above, the parameter values determined by the MS 430 may be necessary to maintain alignment between a CDMA paging cycle and a WiMAX scanning cycle. Accordingly, one or more bits indicating whether the WiMAX parameters of the MOB_SCN-REQ message are optional or mandatory may help ensure alignment between the CDMA paging cycle and the WiMAX scanning cycle.

Further, the MS 430 may need to monitor the paging windows of other networks and, thus, it may be inefficient to frequently re-request scanning time to monitor the paging windows of other networks. Therefore, certain embodiments of the present disclosure may provide one or more bits 934 to indicate whether the MS 430 will perform a finite number of scanning cycle iterations, in accordance with values of the scan iteration field of the MOB_SCN-REQ message, or perform an indefinite number of scanning cycle iterations.

For example, bit 934 with a value of '0' may be used to indicate the MS 430 will complete scanning after the number of iterations provided by the scan iteration field, while bit 934 with the value of "1" may be used to indicate the MS 430 will perform an indefinite number of iterations. If the scanning request conditions field 930 indicates the MS 430 will perform an indefinite number of scanning cycle iterations, the MS may automatically terminate the scanning cycles, for example, by sending a subsequent MOB_SCN-REQ with a scan iteration field with a value of zero.

The current version of the IEEE 802.16 standard also has a field for the MS 430 to indicate which neighboring WiMAX BSs 414 the MS intends to scan. However, if the MS 430 leaves the WiMAX network 410 to listen for a CDMA page request, the MS 430 may not have a neighboring BS 414 to indicate.

Accordingly, embodiments of the present disclosure may include one or more bits 936 to indicate whether the MS 430 intends to stay within the WiMAX network 410 and scan neighboring BSs 414 or switch from the WiMAX network 410 and listen for the page request of other networks. For example, a single bit 936 with a value of "0" may be used to indicate the MS 430 will stay within the WiMAX network 410 and scan neighboring WiMAX BSs 414, while a bit with the value of "1" may be used to indicate the MS 430 will not be scanning neighboring WiMAX BSs 414.

If the scanning request conditions field 930 indicates the MS 430 will stay within the WiMAX network 410 and scan neighboring BSs 414, the MS may indicate which BSs 414 are to be scanned, in accordance with the current version of the IEEE standard. On the other hand, if the scanning request conditions field 930 indicates the MS 430 will not be scanning neighboring BSs 414, the corresponding fields in the MOB_SCN-REQ message, such as the neighbor BSs to be scanned, may not be included.

Similarly, a serving WiMAX BS 414 that grants a MOB_SCN-REQ may expect a response from the MS 430, after the scanning interval, reporting the results of the WiMAX scan of neighboring BSs. For example, a WiMAX BS 414, in sending a MOB_SCN-RSP, may indicate that the MS 430 is to generate a periodic or event-triggered report. However, a MS 430 that switched networks during the scanning interval, to listen for an inter-network paging request, may not have WiMAX scan results to report.

Accordingly, embodiments of the present disclosure may include one or more bits 938 to indicate whether the MS 430 intends to provide a scanning report to the WiMAX BS or whether a WiMAX scanning report is unnecessary and will not be provided. For example, a single bit with a value of "0" may be used to indicate the MS 430 will provide a scanning report to the WiMAX BS 414, in accordance with the current version of the IEEE 802.16 standard, while a bit with the value of "1" may be used to indicate that a WiMAX scanning report is unnecessary and will not be provided.

As illustrated, for certain embodiments, additional bits 940 in the Scanning request conditions field 930 may be reserved for future use.

Figure 10:
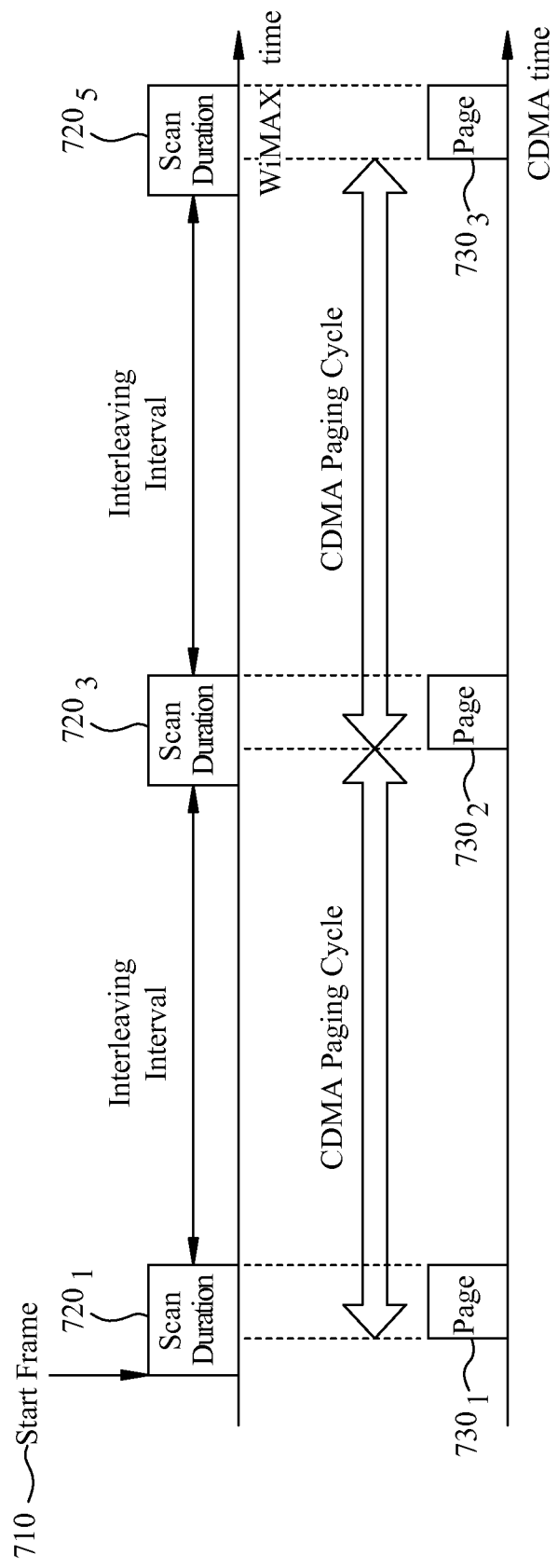
FIG. 10 illustrates the alignment of WiMAX scanning intervals with CDMA 1× paging windows based on WiMAX parameters communicated in a modified mobile scan request, in accordance with embodiments of the present disclosure.

FIG. 10 illustrates how a multi-mode MS 430 may maintain alignment between a WiMAX scanning cycle and a CDMA paging cycle by utilizing a modified mobile scan request message, in accordance with embodiments of the present disclosure. For example, the MS 430 may utilize a larger recommended start frame field TLV to suggest a start frame 710 further in the future. This may allow the MS 430 to overcome larger potential offsets between the start of a CDMA frame and the start of a WiMAX frame, when compared to the recommended start frame field TLV of a MOB_SCN-REQ under the current version of the IEEE 802.16 standard.

Further, the MS 430 may utilize a larger interleaving interval field to provide interleaving intervals of longer duration. As described above, the utilization of a larger interleaving interval field may eliminate unnecessary scanning intervals (e.g., FIG. 7, scanning intervals 7202 and 7204), prevent unnecessary switching to the CDMA network 420, and yield increased throughput on the WiMAX network 410.

Figure 11:
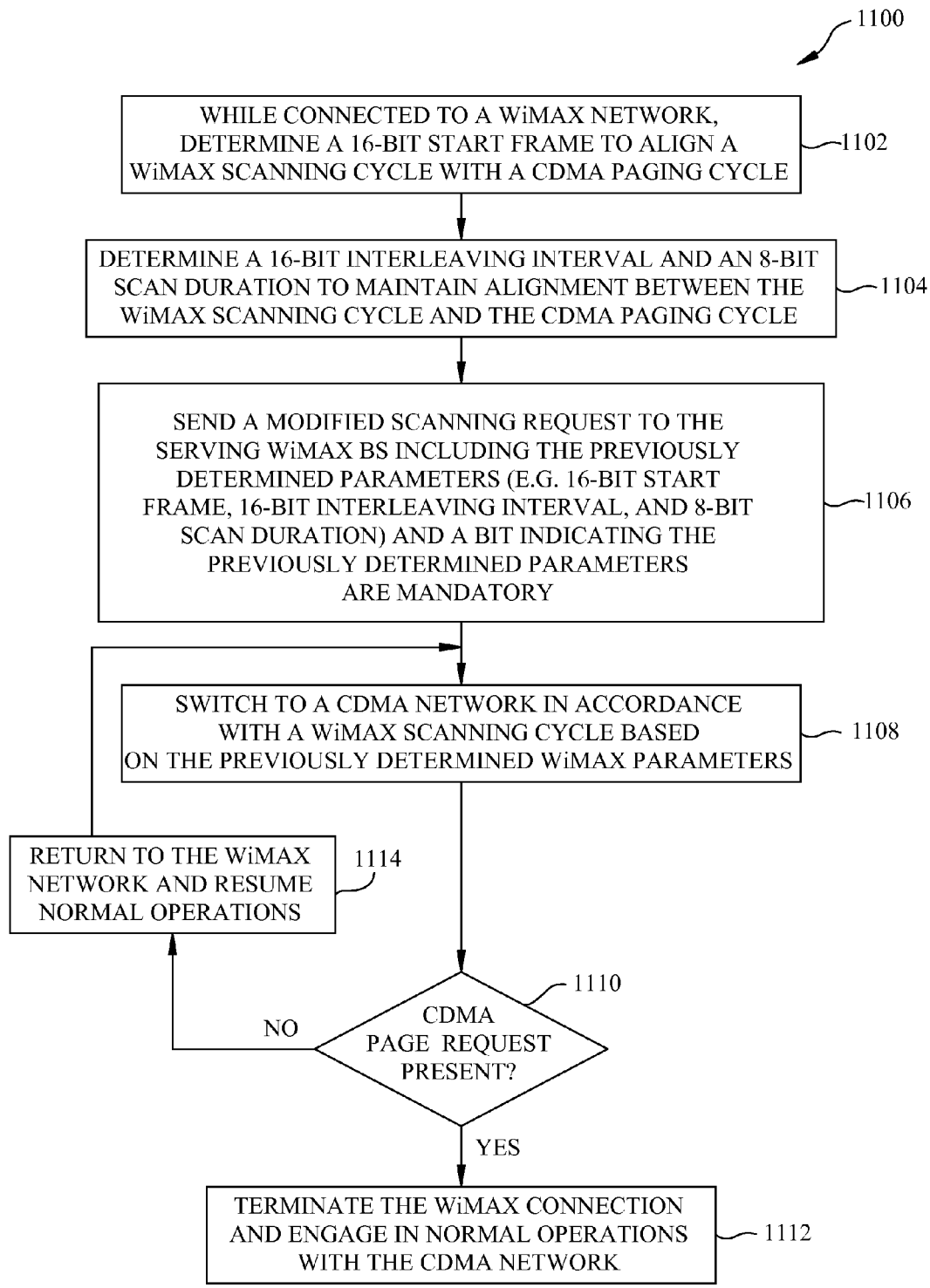
FIG. 11 illustrates example operations performed by a mobile station in switching from a WiMAX network to a CDMA 1× network while utilizing a modified mobile scan request, in accordance with embodiments of the present disclosure.

FIG. 11 illustrates example operations 1100 which may be performed, for example, by a multi-mode MS 430 utilizing a modified MOB_SCN-REQ message, such as that shown in FIG. 9, to communicate with a WiMAX BS 414 while monitoring a CDMA paging channel during a WiMAX scanning interval. The operations 1100 may be performed, for example, to improve the efficiency of a MS 430 in aligning a WiMAX scanning cycle with a CDMA paging cycle and increase the WiMAX throughput on a multi-mode MS 430.

Operations begin, at 1102, with the multi-mode MS 430 determining a WiMAX start frame 710, which may be used to align the start of a WiMAX scanning cycle with the start of a CDMA scanning cycle. For example, the MS may generate a 16-bit start frame value to include in the mobile scanning message, as described above. In some embodiments, determining the WiMAX start frame may include switching briefly to the CDMA network 420 and measuring a timing offset 600 between the start of a WiMAX frame and the start of a CDMA frame.

While measuring the timing offset 600, the multi-mode MS 430 may also determine the WiMAX frame number and the CDMA system time in CDMA frames. It should be noted that a WiMAX frame (T_wm_frame) may have a shorter duration than a CDMA frame. For example, a traditional CDMA frame may have a duration of 20 milliseconds while a comparable WiMAX frame may be 5 milliseconds.

At 1102, the multi-mode MS 430 may determine the 16-bit recommended start frame based on the previously calculated timing offset 600 with modified parameters. The recommended start frame Start_Frame may be calculated by modified equations from EQs (4) and (5), used to reflect 16-bit fields. Accounting for 16-bit values, the modulus functions of these equations become "mod 65536" yielding new EQs (6) and (7) as follows. While monitoring PCH:

$$\text{Start\_Frame} = \left[\frac{20 \text{ ms}}{T\_wm\_frame} * M + N1 - \tau\right] \mod 65536 \quad (6)$$

While monitoring QPCH and PCH:

$$\text{Start\_Frame} = \quad (7)$$
$$\left[\frac{20 \text{ ms}}{T\_wm\_frame} * M + N1 - \frac{100 \text{ ms}}{T\_wm\_frame} - \tau\right] \mod 65536$$

At 1104, the multi-mode MS 430 may determine the 16-bit interleaving interval and 8-bit scan duration based on the previously calculated timing offset 600 with modified parameters. The 16-bit interleaving duration k may be calculated based on modified versions of Equation (3):

$$k = 1.28 \text{ sec} * 2^{Slot\_cycle\_Index}/T\_wm\_frame - \text{Scan\_Duration} \quad (8)$$

In certain embodiments, the duration of the WiMAX interleaving interval (in units of WiMAX frames) may be determined by taking the difference between a scanning cycle and a previously calculated scanning interval.

At 1106, a modified mobile scanning request (MOB_SCN-REQ), including the set of WiMAX parameters, may be sent to the serving WiMAX BS 414. As described above, the set of WiMAX parameters may include a 16-bit WiMAX starting frame, an 8-bit scanning interval duration, and a 16-bit interleaving interval duration. As described above, the greater allowed parameter values may help avoid wasted scanning intervals.

Additionally, the modified MOB_SCN-REQ may include a scanning request conditions field 930 that may have one or more bits communicating supplemental information relevant to the MS 430 tuning to the CDMA network 420. As previously described, the scanning request conditions field may have one or more bits indicating whether the WiMAX parameters of the MOB_SCN-REQ message are optional or mandatory, whether the MS 430 will perform a finite number of scanning cycle iterations, and whether the MS 430 intends to stay within the WiMAX network 410 and scan neighboring BSs 414 or switch from the WiMAX network 410 and listen for the page request of other networks.

The WiMAX BS 414 may use one or more of the provided parameters in establishing a WiMAX scanning cycle such that a WiMAX scanning interval aligns with each of the CDMA paging windows. At 1108, the multi-mode MS 430 may switch to the CDMA network 420 in accordance with the scanning cycle established by the WiMAX BS 414.

At 1110, the MS 430 may then determine if there is a CDMA page request destined for the MS 430 present on the CDMA paging channel. If the CDMA paging channel does not have a paging request destined for the MS 430, the MS may return to the WiMAX network 410 and resume normal WiMAX operations, at 1114. However, embodiments of the present disclosure may allow the MS 430 to remain in the WiMAX network 410 longer before returning to the CDMA network 420 to listen for a CDMA page request, potentially increasing throughput on the WiMAX network 410. However, if the MS 430 receives a CDMA paging request, the MS 430 may automatically terminate the WiMAX connection and engage in normal operations with the CDMA network 420, as illustrated at 1112.

Figure 5A:
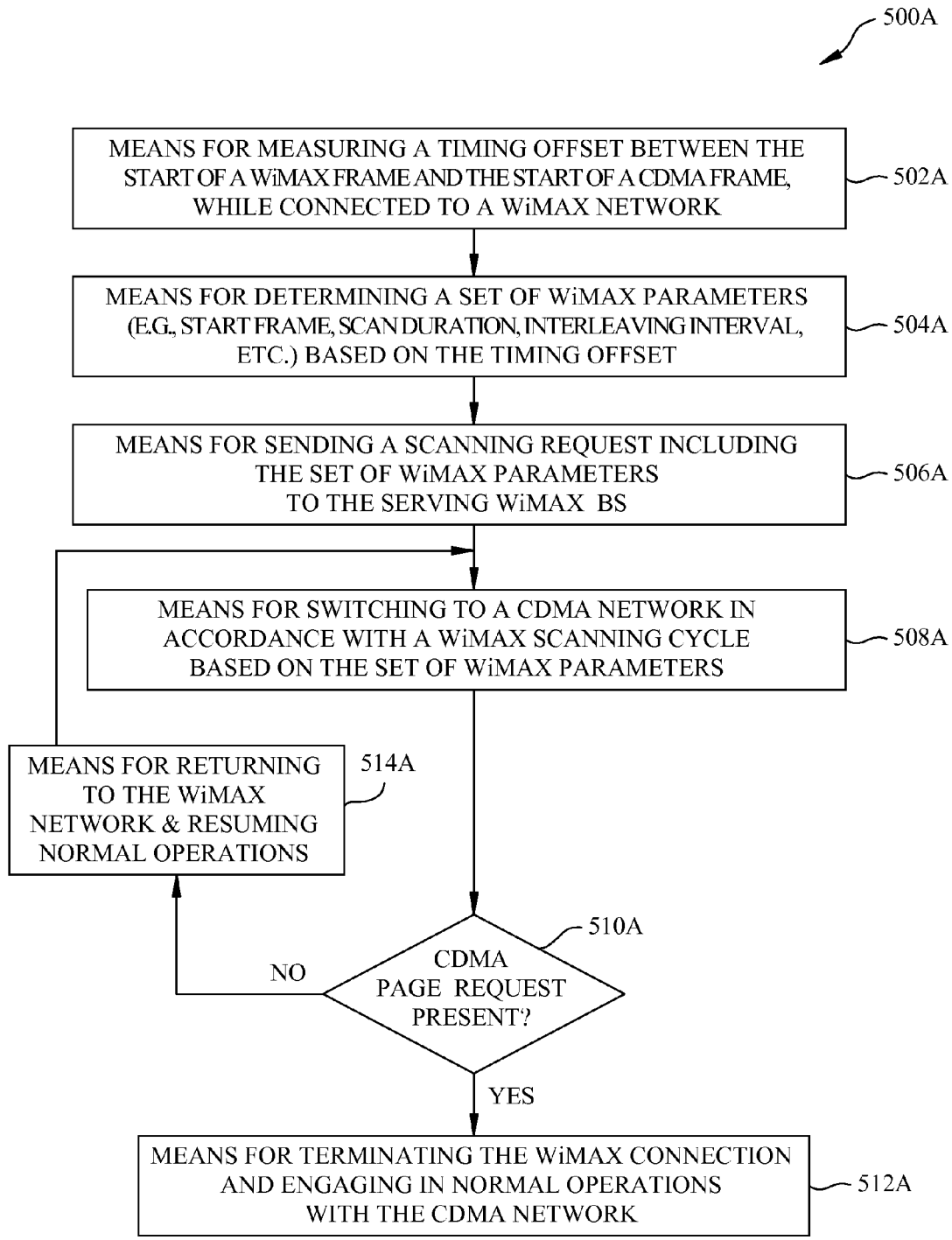
FIG. 5A is a block diagram of means corresponding to the example operations of FIG. 5 for switching from a WiMAX network to a CDMA 1× network during a WiMAX scanning interval, in accordance with embodiments of the present disclosure.
Figure 11A:
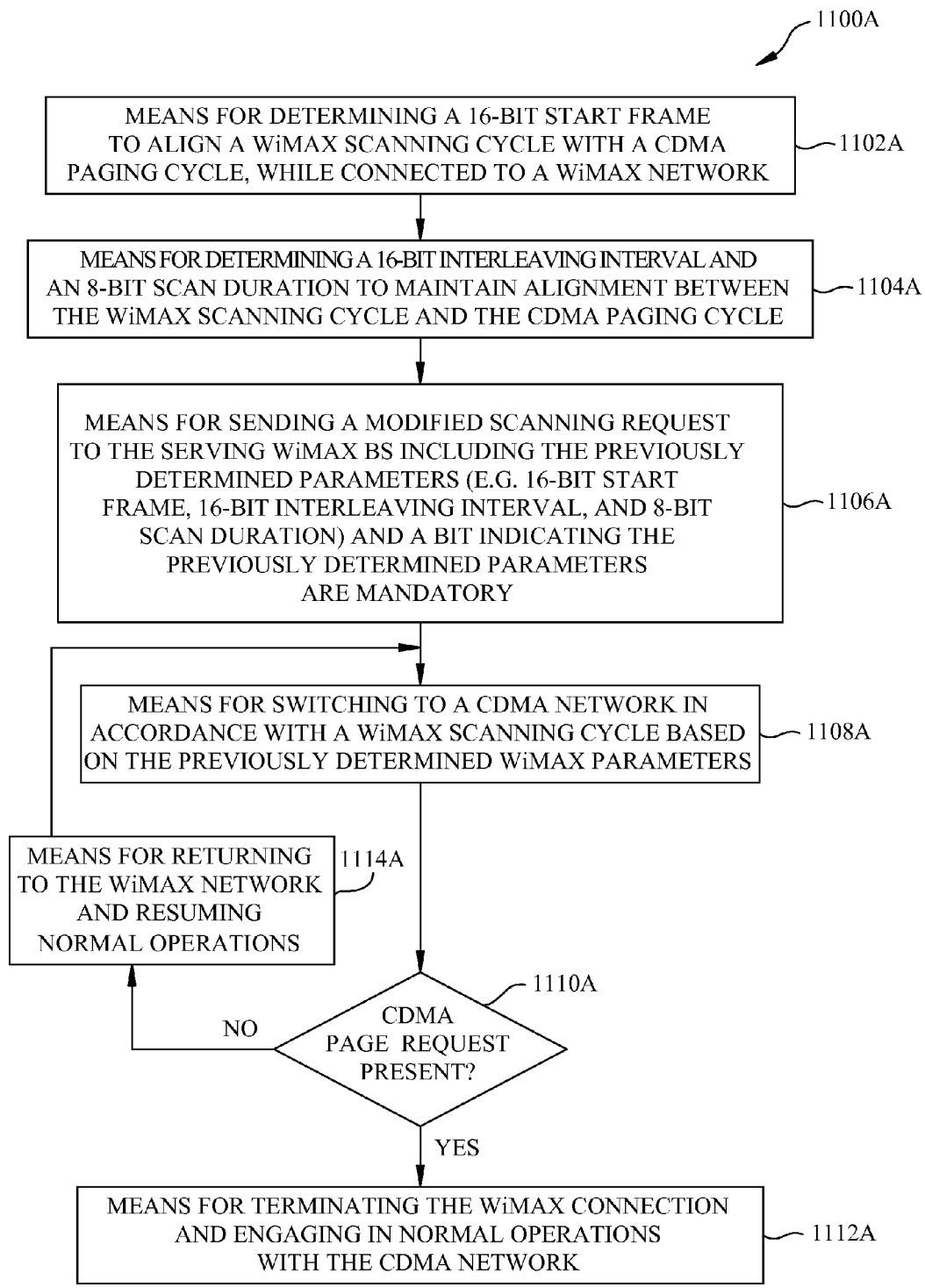
FIG. 11A is a block diagram of means corresponding to the example operations of FIG. 11 for switching from a WiMAX network to a CDMA 1× network while utilizing a modified mobile scan request, in accordance with embodiments of the present disclosure.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, 502-514 illustrated in FIG. 5 correspond to means-plus-function blocks 502A-514A illustrated in FIG. 5A. Similarly, blocks 1102-1114 illustrated in FIG. 11 correspond to means-plus-function blocks 1102A-1114A illustrated in FIG. 11A.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for communicating by a multi-mode mobile station (MS) with first and second networks via first and second radio access technologies (RATs), comprising:
   calculating a start frame number and scanning interval for a scanning cycle for the mobile station to perform with the first RAT, such that the scanning interval of the scanning cycle aligns with at least one paging window of a paging cycle of the second RAT;
   sending a scanning request to a base station of the first network to establish the scanning cycle with the start frame number and the scanning interval;
   switching to the second network to monitor for paging messages during the scanning interval of the scanning cycle when the scanning interval aligns with a paging window of the second network, while maintaining the connection with the first network; and
   scanning neighboring base stations on the first network during the scanning interval of the scanning cycle when the scanning interval is not aligned with a paging window of the second network.

2. The method of claim 1, further comprising:
   sending, in the scanning request, an indication that the scanning cycle will terminate automatically after a specified scan iteration.

3. The method of claim 1, further comprising:
   sending, in the scanning request, an indication that the scanning cycle will continue until the mobile station deactivates the scanning by sending a separate scanning request.

4. The method of claim 1, further comprising:
   sending, in the scanning request, an indication of whether or not the MS will include neighbor base stations in a mobile scan request.

5. The method of claim 1, further comprising:
   sending, in the scanning request, an indication of whether or not the MS intends to provide a scanning report with results of scanning neighboring base stations.

6. The method of claim 1, wherein one of the first and second RATs supported by the mobile station comprises a RAT in accordance with one or more standards of the Institute of Electrical and Electronics Engineers (IEEE) 802.16 family of standards.

7. The method of claim 1, wherein one of the first and second RATs supported by the mobile station comprises a code division multiple access (CDMA) RAT.

8. The method of claim 7, wherein another of the first and second RATs supported by the mobile station comprises a RAT in accordance with one or more standards of the Institute of Electrical and Electronics Engineers (IEEE) 802.16 family of standards.

9. An apparatus for communicating by a multi-mode mobile station (MS) with first and second networks via first and second radio access technologies (RATs), comprising:
   a processor;
   memory in electronic communication with the processor; and
   instructions stored in the memory and executable by the processor to:
   calculate a start frame number and a scanning interval for a scanning cycle for the mobile station to perform with the first RAT, such that the scanning interval of the scanning cycle aligns with at least one paging window of a paging cycle of the second RAT;
   send a scanning request to a base station of the first network to establish the scanning cycle with the start frame number and scanning interval;
   switch to the second network to monitor for paging messages during the scanning interval of the scanning cycle when the scanning interval aligns with a paging window of the second network, while maintaining the connection with the first network; and
   scan neighboring base stations on the first network during the scanning interval of the scanning cycle when the scanning interval is not aligned with a paging window of the second network.

10. The apparatus of claim 9, wherein the instructions are executable by the processor to indicate, in the scanning request, that the scanning cycle will terminate automatically after a specified scan iteration.

11. The apparatus of claim 9, wherein the instructions are executable by the processor to indicate, in the scanning request, that the scanning cycle will continue until the mobile station deactivates the scanning by sending a separate scanning request.

12. The apparatus of claim 9, wherein the instructions are executable by the processor to indicate, in the scanning request, whether or not the MS will include neighbor base stations in a mobile scan request.

13. The apparatus of claim 9, wherein the instructions are executable by the processor to indicate, in the scanning request, whether or not the MS intends to provide a scanning report with results of scanning neighboring base stations.

14. The apparatus of claim 9, wherein one of the first and second RATs supported by the mobile station comprises a RAT in accordance with one or more standards of the Institute of Electrical and Electronics Engineers (IEEE) 802.16 family of standards.

15. The apparatus of claim 9, wherein one of the first and second RATs supported by the mobile station comprises a code division multiple access (CDMA) RAT.

16. The apparatus of claim 15, wherein another of the first and second RATs supported by the mobile station comprises a RAT in accordance with one or more standards of the Institute of Electrical and Electronics Engineers (IEEE) 802.16 family of standards.

17. An apparatus for communicating by a multi-mode mobile station (MS) with first and second networks via first and second radio access technologies (RATs), comprising:
  means for calculating a start frame number and a scanning interval for a scanning cycle for the mobile station to perform with the first RAT, such that the scanning interval of the scanning cycle aligns with a paging window of a paging cycle of the second RAT;
  means for sending a scanning request to a base station of the first network to establish the scanning cycle with the start frame number and scanning interval;
  means for switching to the second network to monitor for paging messages during the scanning interval of the scanning cycle when the scanning interval aligns with a paging window of the second network, while maintaining the connection with the first network; and
  means for scanning neighboring base stations on the first network during the scanning interval of the scanning cycle when the scanning interval is not aligned with a paging window of the second network.

18. The apparatus of claim 17, wherein the means for sending a scanning request is configured to indicate, in the scanning request, that the scanning cycle will terminate automatically after a specified scan iteration.

19. The apparatus of claim 17, wherein the means for sending a scanning request is configured to indicate, in the scanning request, that the scanning cycle will continue until the mobile station deactivates the scanning by sending a separate scanning request.

20. The apparatus of claim 17, wherein the means for sending a scanning request is configured to indicate, in the scanning request, whether or not the MS will include neighbor base stations in a mobile scan request.

21. The apparatus of claim 17, wherein the means for sending a scanning request is configured to indicate, in the scanning request, whether or not the MS intends to provide a scanning report with results of scanning neighboring base stations.

22. The apparatus of claim 17, wherein one of the first and second RATs supported by the mobile station comprises a RAT in accordance with one or more standards of the Institute of Electrical and Electronics Engineers (IEEE) 802.16 family of standards.

23. The apparatus of claim 17, wherein one of the first and second RATs supported by the mobile station comprises a code division multiple access (CDMA) RAT.

24. The apparatus of claim 23, wherein another of the first and second RATs supported by the mobile station comprises a RAT in accordance with one or more standards of the Institute of Electrical and Electronics Engineers (IEEE) 802.16 family of standards.

25. A non-transitory computer-program product for communicating by a multi-mode mobile station (MS) with first and second networks via first and second radio access technologies (RATs), comprising a non-transitory computer readable medium having instructions stored thereon, the instructions being executable by one or more processors and the instructions comprising:
  instructions for calculating a start frame number and a scanning interval for a scanning cycle for the mobile station to perform with the first RAT, such that the scanning interval of the scanning cycle aligns with a paging window of a paging cycle of the second RAT;
  instructions for sending a scanning request to a base station of the first network to establish the scanning cycle with the start frame number and scanning interval;
  instructions for switching to the second network to monitor for paging messages during the scanning interval of the scanning cycle when the scanning interval aligns with a paging window of the second network, while maintaining the connection with the first network; and
  instructions for scanning neighboring base stations on the first network during the scanning interval of the scanning cycle when the scanning interval is not aligned with a paging window of the second network.

26. The non-transitory computer-program product of claim 25, wherein the instructions further comprise:
  instructions for sending, in the scanning request, an indication that the scanning cycle will terminate automatically after a specified scan iteration.

27. The non-transitory computer-program product of claim 25, wherein the instructions further comprise:
  instructions for sending, in the scanning request, an indication that the scanning cycle will continue until the mobile station deactivates the scanning by sending a separate scanning request.

28. The non-transitory computer-program product of claim 25, wherein the instructions further comprise:
  instructions for sending, in the scanning request, an indication of whether or not the MS will include neighbor base stations in a mobile scan request.

29. The non-transitory computer-program product of claim 25, wherein the instructions further comprise:
  instructions for sending, in the scanning request, an indication of whether or not the MS intends to provide a scanning report with results of scanning neighboring base stations.

30. The non-transitory computer-program product of claim 25, wherein one of the first and second RATs supported by the mobile station comprises a RAT in accordance with one or more standards of the Institute of Electrical and Electronics Engineers (IEEE) 802.16 family of standards.

31. The non-transitory computer-program product of claim 25, wherein one of the first and second RATs supported by the mobile station comprises a code division multiple access (CDMA) RAT.

32. The non-transitory computer-program product of claim 31, wherein another of the first and second RATs supported by the mobile station comprises a RAT in accordance with one or more standards of the Institute of Electrical and Electronics Engineers (IEEE) 802.16 family of standards.

33. A method for communicating by a multi-mode mobile station (MS) with first and second networks via first and second radio access technologies (RATs), the method comprising:
- calculating a start frame number and scanning interval for a scanning cycle for the mobile station to perform with the first RAT, such that the scanning interval of the scanning cycle aligns with a paging window of a paging cycle of the second RAT;
- sending a scanning request to a base station of the first network to establish the scanning cycle with the start frame number and scanning interval wherein the scanning request comprises an indication that the scanning cycle will continue until the mobile station deactivates the scanning by sending a separate scanning request; and
- switching to the second network to monitor for paging messages during the scanning interval of the scanning cycle without terminating the connection with the first network.

34. An apparatus for communicating by a multi-mode mobile station (MS) with first and second networks via first and second radio access technologies (RATs), comprising:
- a processor;
- memory in electronic communication with the processor; and
- instructions stored in the memory and executable by the processor to:
  - calculate a start frame number and a scanning interval for a scanning cycle for the mobile station to perform with the first RAT, such that the scanning interval of the scanning cycle aligns with a paging window of a paging cycle of the second RAT;
  - send a scanning request to a base station of the first network to establish the scanning cycle with the start frame number and scanning interval, wherein the scanning request comprises an indication that the scanning cycle will continue until the mobile station deactivates the scanning by sending a separate scanning request; and
  - switch to the second network to monitor for paging messages during the scanning interval of the scanning cycle without terminating the connection with the first network.

35. An apparatus for communicating by a multi-mode mobile station (MS) with first and second networks via first and second radio access technologies (RATs), comprising:
- means for calculating a start frame number and a scanning interval for a scanning cycle for the mobile station to perform with the first RAT, such that the scanning interval of the scanning cycle aligns with a paging window of a paging cycle of the second RAT;
- means for sending a scanning request to a base station of the first network to establish the scanning cycle with the start frame number and scanning interval wherein the scanning request comprises an indication that the scanning cycle will continue until the mobile station deactivates the scanning by sending a separate scanning request; and
- means for switching to the second network to monitor for paging messages during the scanning interval of the scanning cycle without terminating the connection with the first network.

36. A non-transitory computer-program product for communicating by a multi-mode mobile station (MS) with first and second networks via first and second radio access technologies (RATs), comprising a non-transitory computer readable medium having instructions stored thereon, the instructions being executable by one or more processors and the instructions comprising:
- instructions for calculating a start frame number and a scanning interval for a scanning cycle for the mobile station to perform with the first RAT, such that the scanning interval of the scanning cycle aligns with a paging window of a paging cycle of the second RAT;
- instructions for sending a scanning request to a base station of the first network to establish the scanning cycle with the start frame number and scanning interval and wherein the scanning request comprises an indication that the scanning cycle will continue until the mobile station deactivates the scanning by sending a separate scanning request; and
- instructions for switching to the second network to monitor for paging messages during the scanning interval of the scanning cycle without terminating the connection with the first network.

* * * * *